No. 722,150. PATENTED MAR. 3, 1903.
G. L. SCOTT.
FRICTION CLUTCH.
APPLICATION FILED AUG. 15, 1902.
NO MODEL.
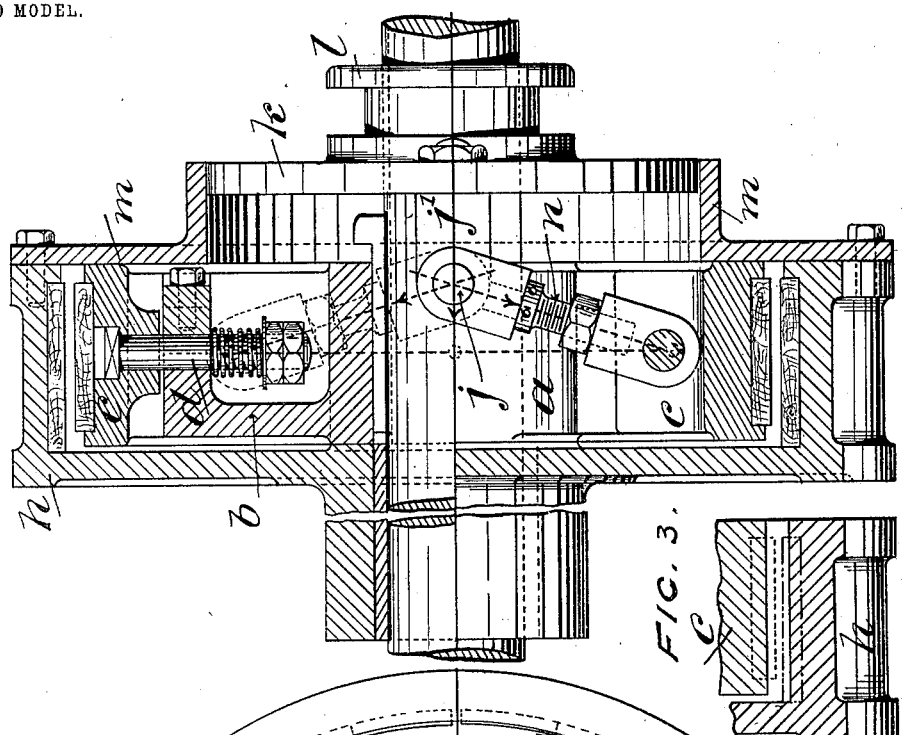
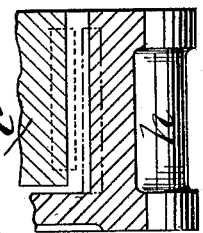
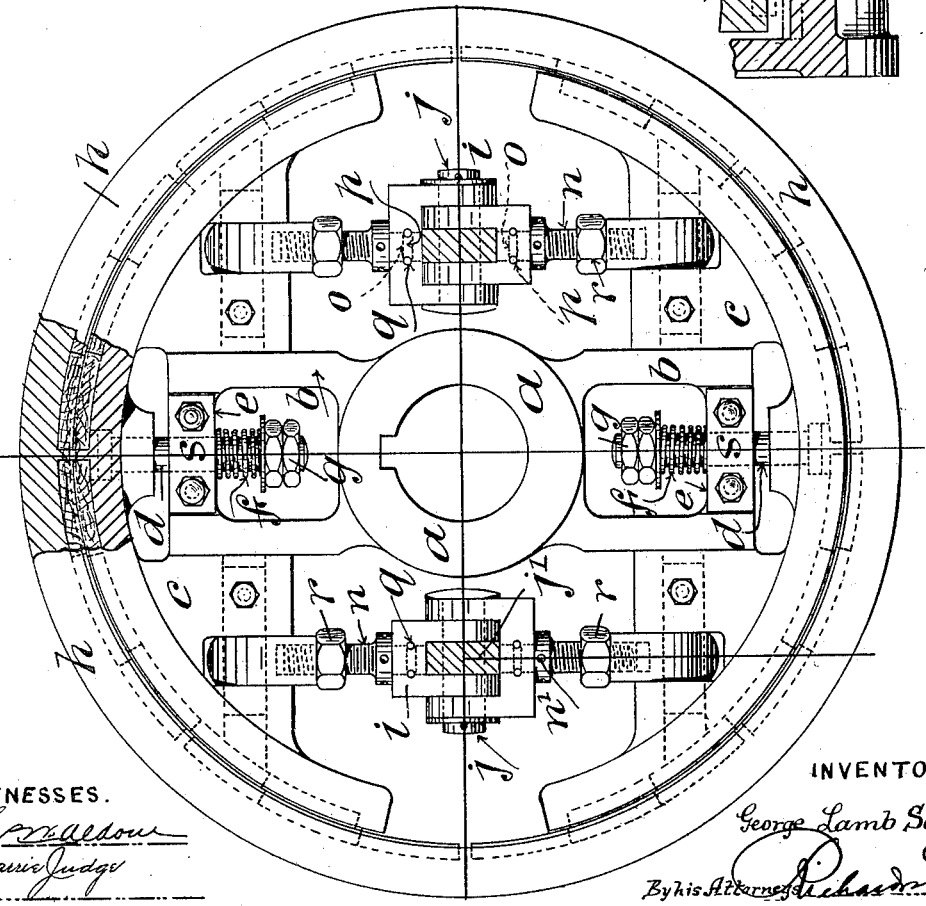
WITNESSES.
INVENTOR.
George Lamb Scott.
By his Attorney

UNITED STATES PATENT OFFICE.

GEORGE LAMB SCOTT, OF ROCHDALE, ENGLAND, ASSIGNOR TO JAMES PILKINGTON ORMEROD, OF CASTLETON, NEAR MANCHESTER, ENGLAND.

FRICTION-CLUTCH.

SPECIFICATION forming part of Letters Patent No. 722,150, dated March 3, 1903.

Application filed August 15, 1902. Serial No. 119,804. (No model.)

*To all whom it may concern:*

Be it known that I, GEORGE LAMB SCOTT, engineer, a subject of the King of Great Britain and Ireland, residing at Oaklands, Rochdale, in the county of Lancaster, England, have invented certain new and useful Improvements in Friction-Clutches, (for which I have made application in Great Britain, No. 9,466, and dated April 20, 1902,) of which the following is a specification.

My invention relates to a friction-clutch and is illustrated in the accompanying drawings.

Figure 1 shows the friction-clutch in front elevation and with cover-plate, &c., removed. Fig. 2 is a sectional elevation of the clutch. Fig. 3 is a detail view.

In constructing a friction-clutch in accordance with my invention I provide the boss $a$ of the internal friction half with arms carrying segments. Preferably there are two arms or drivers $b$, each carrying a segment $c$, the peripheries of the two segments providing almost a complete circle. To prevent the two segments from moving outward by centrifugal force when the clutch-halves are disengaged, I provide each segment with a pin or stud $d$, passing through a flange or ledge $e$ on the arm, and place a spiral spring $f$ between the ledge and a nut or nuts $g$ on the end of the stud. When the clutch is in action, as shown in Fig. 1, the segments $c$ being thrust outward compress the spiral springs $f$, the springs thus having a tendency to draw the segments inward toward the axis of the shaft $g$, on which the friction-clutch is mounted.

In Fig. 2 the clutch is shown out of action.

In conjunction with the inner half of the clutch I provide an outer shell $h$, which may be the driver or be driven, as desired.

To bring the inner clutch half into and take it out of action, I pivot to each segment two toggle-links $i$, the ends of which are jawed and also pivoted upon studs $j$, centered in arms $j'$, carried by a disk $k$, which is slidable on the shaft to actuate the toggle-links by a sliding collar $l$. This collar $l$ and attached disk $k$ are slid on the shaft by any usual well-known means. The outer shell $h$ is provided with a flanged ring $m$, the disk $k$, actuating the toggle-links, sliding within the flange of the ring, so that the flanged ring and disk effectively shroud the internal friction half and act as a guard to prevent accidents. I provide special means for adjusting the length of the toggle-links $i$ to compensate for wear, as follows: Each link is formed with a jawed end at the point of connection with the arms carried by the slidable disk, as stated, and a shank $n$ is arranged to be rotatable within the jaw, but is prevented from being withdrawn therefrom. To effect this object, I form the shank with an annular recess $o$ and a corresponding annular groove $p$ in the jawed end of the link. Two pins $q$ occupy the recess, and while preventing the withdrawal of the shank $n$ permit its rotation. The shank is screwed and engages with the end of the link pivoted to the segment $c$, so that by rotating the screwed shank the length of the link can be altered at will, a lock-nut $r$ being employed to maintain the desired adjustment. To enable the shanks $n$ to be easily rotated, they may be provided with holes $n'$ at intervals. By means of a pin or tool inserted into one of the holes the shanks may be rotated and adjusted as required. The segments $c$, with connecting toggle-links, may be placed *in situ* intact or removed without unkeying or disconnecting the driving-boss and arms. This is provided for by means of a loose cap $s$, securing the studs $d$, on which the springs $f$ are mounted, to the arms of the driving-boss. When the cap $s$ is removed, the segments may be readily withdrawn.

To increase the frictional grip, I provide the inner periphery of the outer shell of the clutch and the periphery of the segments $c$ with a continuous or practically continuous liner of wood or other material, such as vulcanite or rubber composition. This liner may be composed of segments placed in recesses and projecting beyond the metal of the outer shell and segments, as shown in Figs. 1 and 2. Abutments are formed in the metal of shell and segments to prevent the liner from rotating when in frictional driving contact.

As indicated in Fig. 3, I might put the wooden or other periphery upon the segments $c$ only, as shown in the dotted lines, or upon the outer shell only, as shown in the dot-and-dash lines, or the liner may be dispensed with entirely and the outer shell and segments work metal to metal, as in full lines.

I declare that what I claim is—

1. A friction-clutch consisting of a boss provided with arms, segments slidable upon the arms, to form almost a complete ring, a disk slidable on the shaft carrying toggle-links to actuate the segments, springs to prevent the segments moving outward by centrifugal force when the clutch is disengaged, and an outer shell substantially as described.

2. In combination in a friction-clutch a boss provided with arms, slidable segments upon the arms, a disk slidable on the shaft, toggle-links actuated by the disk to slide the segments, springs to prevent the segments moving outward by centrifugal force when the clutch is disengaged, an outer shell with an internal liner of non-slipping material, and having a flanged ring substantially as described.

3. In combination in a friction-clutch a boss provided with arms, slidable segments upon the arms having a periphery of non-slipping material, a disk slidable on the shaft, toggle-links actuated by the disk to operate the segments, springs to prevent the segments moving outward when the clutch is disengaged, and an outer shell having a flanged ring substantially as described.

4. In combination in a friction-clutch a boss provided with arms, slidable segments upon the arms having a periphery of non-slipping material, a disk slidable on the shaft, toggle-links actuated by the disk to operate the segments, means for adjusting the length of the toggle-links, springs to prevent the segments moving outward when the clutch is disengaged, and an outer shell having a flanged ring substantially as described.

5. In combination, a shell $h$, segments operating within the same and adapted to contact therewith, toggle mechanism for operating the said segments, a ring secured to the shell $h$ and having a flange, a disk slidable within said flange and connected to the toggle mechanism and means for operating the disk, substantially as described.

In witness whereof I have hereunto set my hand in presence of two witnesses.

GEORGE LAMB SCOTT.

Witnesses:
 JOSHUA ENTWISLE,
 ALFRED YATES.